Patented July 17, 1934

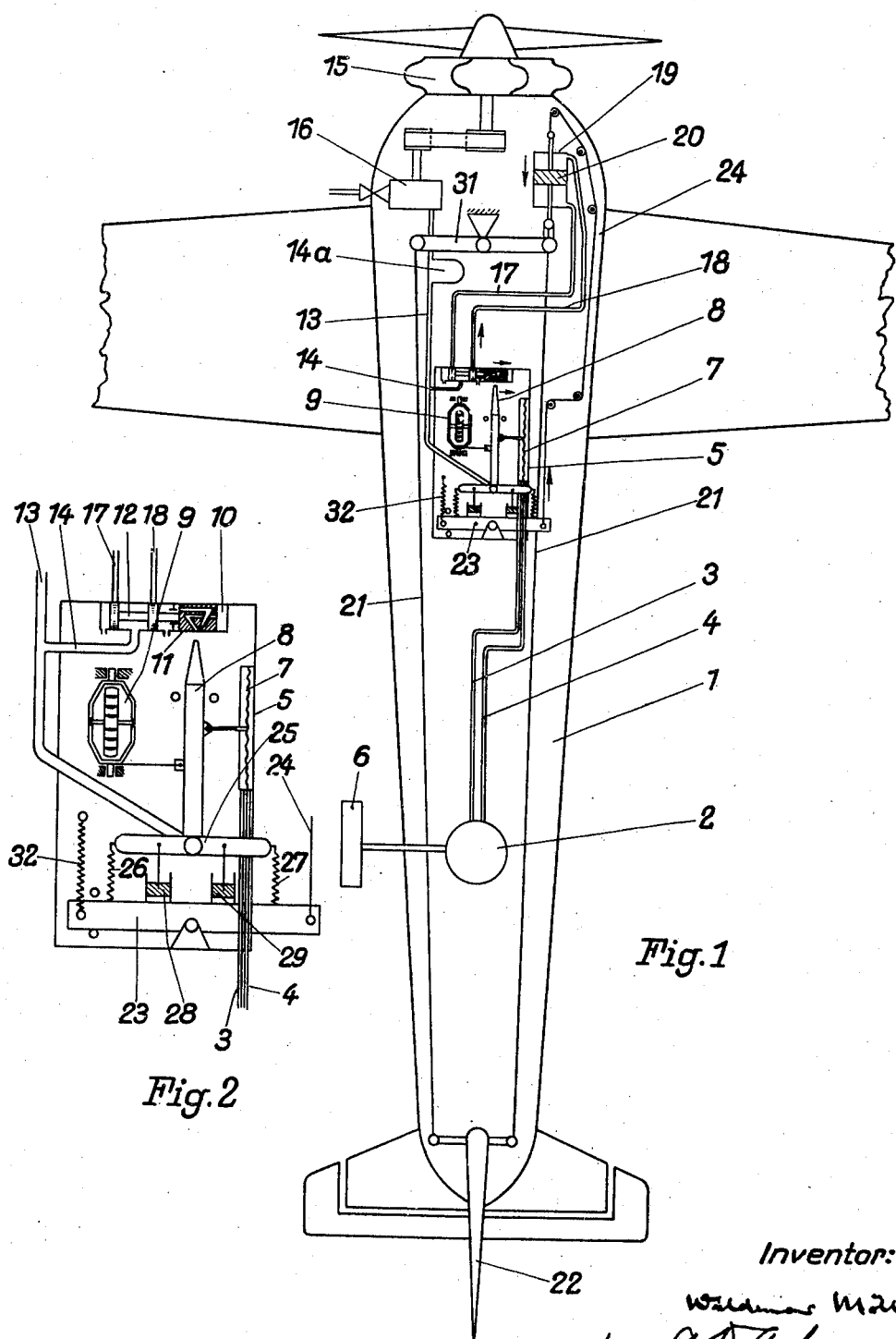

1,967,155

UNITED STATES PATENT OFFICE 1,967,155

AIRCRAFT CONTROL SYSTEM

Waldemar Möller, Berlin-Zehlendorf, Germany, assignor to Askania-Werke A. G. vormals Central Werkstatt Dessau und Carl Bamberg-Friedenau, a German company Application February 2, 1934, Serial No. 709,519
In Germany August 14, 1931

6 Claims. (Cl. 244—29)

This invention relates to a method and an apparatus for controlling aircraft, more particularly to a compensation system to prevent over-regulations of control mechanism which serves to regulate a certain condition of an aircraft. For purpose of illustration, I have applied this system to the directional control of an airplane.

The method can also be applied to any other condition which has to be controlled by an automatic pilot, for example, an altitude control, rate of climb control, etc.

In controlling aircraft, one of the greatest difficulties to be overcome is that there is a time lag between the beginning of control movements of the main rudder, for example, and its effect on the aircraft. Any relay or control system has therefore to be compensated to prevent overregulation which would result in an unstable condition and the so-called hunting of the control proper. The purpose of this invention is to provide means which insure stable control of any condition of the aircraft and thereby increase the safety and the reliability of an automatic control. Further aims of my invention will appear in the following description.

For an illustration of one of the many various forms my invention may take, reference is to be had to the accompanying drawing, in which:

Fig. 1 is a diagrammatic illustration of the mechanism applied to the rudder control of an airplane; and Fig. 2 is a diagrammatic view on an enlarged scale of a portion of the mechanism and particularly of the control system applied.

It is understood that this method of automatic rudder control is by no means confined to the control system described, but can also be advantageously used with any other type of control system, be it mechanical, hydraulical or electrical.

The relay mechanism used for illustration of this invention is a hydraulical one, the so-called jet-pipe principle of which has been disclosed in the U. S. Patent No. 1,620,707.

In order to control the direction of an aircraft it is necessary to operate the rudder in accordance with the indication of a suitable direction indicator or standard of position such as a magnetic compass, gyroscope or the like. For automatic control purposes the equilibrium between the action of a gyroscopic turn indicator and an impulse of a magnetic system is used to operate the relay. In the embodiment of my invention I have employed a pneumatic magnetic compass which is described in detail in U. S. Patent 1,729,850. This compass is designated 2 in Fig. 1 and furnishes a differential pressure which is proportional to the deviation from the set direction. This differential pressure is applied by means of two conduits 3 and 4 to both sides of a diaphragm 7. The air necessary to operate this magnetic compass system is supplied by the suction produced by the Venturi tube 6 mounted outside of the fuselage of the aircraft. The action of the diaphragm 7 on the relay jet tube or nozzle 8 is balanced by a turn indicator 9 in a known manner, for example, as in U. S. Patent 1,795,694. Any deviation from the disclosed set course will start to move the double acting piston 20 which in turn operates the rudder 22 by means of the lever system 31.

In order to prevent overregulation, compensators have to be used which reset the relay mechanism, in this case the hydraulic jet-pipe 8, to its neutral position after the movement of the piston 20 and the control surface or rudder 22. For this purpose, it has been customary to use compensators of the so-called position type. The action of such a compensator is as follows: As soon as the operating piston 2 moves, it changes by mechanical lever systems the setting of the neutral position of the control. Although such a control system is rather sensitive and serves its purpose in many cases, it has a number of serious disadvantages. First of all, it is absolutely necessary to avoid any friction in the lever system which resets the control as elongation of ropes or levers which transmit the movement of the moving piston to the relay mechanism would result in an undesired change of the intended control setting. In order to eliminate this friction, it is usually necessary to build the relay system as close as possible to the moving piston or the operating motor. However, it is difficult to install such a system in the average aircraft where only limited space is available.

The invention overcomes these difficulties by using an improved compensator for aircraft which applies compensating forces to the relay system. The type of relay used produces the maximum control effect by only a very small movement of the relay proper. At the same time, the relay is very sensitive and operates in response to very small impulses, the forces necessary to balance the relay being extremely small and therefore the danger of elongation in the transmitting lever systems is practically eliminated.

The action of the whole control system will be more easily understood by referring to the accompanying sketches. If, for example, the aircraft 1 moves, under the action of wind or for any other reasons, out of its course to the right, the jet-pipe 8 will move to the right under the impulses obtained from the magnetic compass 2 and the diaphragm 7 as well as by the action of the directional gyro 9 and the piston 20 which operates in cylinder 19 will move backward or in the direction of the arrow in Fig. 1. The movement of the piston 20 is transmitted through lever system 31 to the main rudder 22 which will be moved to the left and thereby steer the airplane to the left. In order to prevent the control from going too far, the piston 20 is also connected to the lever system 23 by any suitable mechanical means such as a rope 24 which is kept tight preferably by a spring 32. When the system moves, as described above, the compensating lever 23 will turn counterclockwise and thereby turn the jet-pipe to its neutral position. The two dash-pots 28 and 29 are mechanically connected to lever 25 and lever 23. They consist of two pistons which are connected by connecting rods to lever 25 and cooperate with two cylinders mounted on lever 23. As there are small orifices (not shown in the drawing) connecting the inside of the cylinders with the atmosphere, these dashpots act as a solid connection between levers 25 and 23 for sudden movements of the latter. As the air escapes from these cylinders, the jet-pipe gradually comes under the influence of the springs 26 and 27 which, in the above example, would apply a counterclockwise momentum of forces to the lever 25 and the jet-pipe 8. The balancing mechanism therefore would act for sudden changes of the aircraft's direction, like a direct position balancing system which gradually becomes a balancing system using forces to compensate the action of the impulses as the air escapes out of the dash-pots. It has been found that these dash-pots greatly increase the sensitivity of the control and that they dampen oscillations of the relay mechanism. As the main rudder 22 has turned counterclockwise to a certain degree and the relay mechanism has come to its neutral position under the action of the compensating means, the aircraft will fly a left curve until the gyro and the magnetic compass are back again on the set direction. The very scope of the invention resides therefore in using forces to compensate the relay mechanism and prevent the control mechanism from overregulating.

The action of the relay system is as follows:

The jet-pipe 8 obtains a fluid supply, such as air or oil, from a compressor or pump 16 which is connected to the airplane motor 15. The fluid is led through conduit 13 to the fulcrum of lever 25 and through the jet-pipe 8 which ends in a conical nozzle. In front of this jet-pipe nozzle there is an auxiliary piston 12 which also gets its fluid supply from conduit 13 through a branch conduit 14. By a movement of piston 12 to the right conduit 13 communicates with conduit 18 and therefore with the forward side of piston 20 which moves in the cylinder 19. This causes the piston 20 to move rearwardly and to operate the control in the manner described above. By moving the auxiliary piston 12 to the right conduit 17 is opened and the fluid which is in the cylinder on the other side of the piston 20 escapes to the outside. A movement of the auxiliary piston 12 to the left will have the opposite effect. In order to move the auxiliary piston 12 proportional to the movement of the nozzle of jet-pipe 8, it is connected with a piston 11 which operates inside of cylinder 10. Exactly in front of the jet-pipe nozzle there are two openings which are crosswise connected to either side of the piston 11. If the fluid leaving the jet-pipe nozzle under a high velocity hits between the two openings in front of it in such a manner that the differential pressure which is built up times the difference in area results in an equilibrium, the jet-pipe is in its neutral position and the ports of conduit 17 and 18 are closed. If the jet-pipe 8 moves to the right, there is immediately an increase in differential pressure on both sides of piston 11 and piston 11 will move inside of cylinder 10 until the two openings are again in the same relative position to jet-pipe 8. In this way, the auxiliary piston 12, although not mechanically connected to jet-pipe 8, will follow instantaneously all movements of the jet-pipe 8. A movement of the jet-pipe to the left will reverse the action. Two stops shown as circles in Fig. 2 on either side of the jet-pipe prevent it from going too far.

I am aware of the fact that different forms of relay compensating systems can be applied for the same purpose without departing from the spirit of this invention. Practically any condition of the aircraft can be controlled by the system described above whereby different impulse systems would replace the directional system shown in the illustrated embodiment of the invention; and I therefore desire the present embodiment to be considered in all respects as illustrative and not restrictive, reference being had to the appended claims rather than to the foregoing description to indicate the scope of the invention.

I claim:

1. In an automatic control system for aircraft, a standard of position; a control surface; a motor for operating said control surface; control means for said motor; operating connections between said standard of position and said control means; and compensating mechanism operated in response to the movement of said control surface for biasing said control means toward its neutral position to prevent overregulation, said compensating mechanism being resiliently connected to said control means to transmit biasing force thereto.

2. In an automatic control system for aircraft, a standard of position; a control surface; a motor for operating said control surface; control means for said motor; operating connections between said standard of position and said control means; and compensating mechanism operated in response to the movement of said control surface for biasing said control means toward its neutral position to prevent overregulation including a compensating lever and resilient members connecting said compensating lever to said control means.

3. In an automatic control system for aircraft, a standard of position; a control surface; a motor for operating said control surface; control means for said motor; operating connections between said standard of position and said control means; and compensating mechanism operated in response to the movement of said control surface for biasing said control means toward its neutral position to prevent overregulation including a compensating lever pivoted intermediate its ends and springs connecting the lever on opposite sides of its pivot to said control means.

4. In an automatic control system for aircraft, a standard of position; a control surface; a motor for operating said control surface; control means for said motor; operating connections between said standard of position and said control means; and compensating mechanism operated in response to the movement of said control surface for biasing said control means toward its neutral position to prevent overregulation including a pivoted lever having dashpot and resilient connections to said control means.

5. In an automatic control system for aircraft having a compass, a turn indicator and a rudder connected to a fluid operated control motor, control means for the motor including a hydraulic piston valve governing the flow of fluid to said motor; a pivoted jet-pipe controlling the operation of the hydraulic valve and operatively connected to said compass and said turn indicator; and compensating means operating in response to changes in the position of the rudder to bias the jet-pipe to its neutral position including a lever movable with the jet-pipe, a second lever movable by the rudder and the motor relative to said first lever and springs and dashpots connecting the levers to each other.

6. In an automatic control system for aircraft having a compass, a turn indicator and a rudder connected to a fluid operated control motor, control means for the motor including a hydraulic piston valve governing the flow of fluid to said motor; a pivoted jet-pipe controlling the operation of the hydraulic valve and operatively connected to said compass and said turn indicator; and conpensating means operating in response to changes in the position of the rudder to bias the jet-pipe to its neutral position including a lever rigidly connected intermediate its ends to the jet-pipe, a compensating lever pivoted intermediate its ends connected to be operated by the motor and a pair of dashpots and springs connecting the levers on opposite sides of their pivots.

WALDEMAR MÖLLER.